US006714250B1

(12) United States Patent
Correa et al.

(10) Patent No.: US 6,714,250 B1
(45) Date of Patent: Mar. 30, 2004

(54) METHOD AND APPARATUS FOR PROCESSING VIDEO PICTURES, IN PARTICULAR FOR LARGE AREA FLICKER EFFECT REDUCTION

(75) Inventors: Carlos Correa, Villingen-Schwenningen (DE); Sébastien Weitbruch, Mönchweiler (DE); Rainer Zwing, Villingen-Schwenningen (DE); Gangolf Hirtz, Kronach (DE)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/357,191

(22) Filed: Jul. 20, 1999

(30) Foreign Application Priority Data

Aug. 19, 1998 (EP) ........................................... 98115607

(51) Int. Cl.[7] ................................................ H04N 5/57

(52) U.S. Cl. ...................... 348/447; 348/624; 348/910; 345/691; 345/690

(58) Field of Search ................................ 348/607, 910, 348/687, 671, 797, 800, 683, 624, 447; 345/690, 691, 692, 60, 63, 77, 694, 696; H04N 5/57

(56) References Cited

U.S. PATENT DOCUMENTS 5,187,578 A 2/1993 Kohgami et al. ........... 348/687
5,602,559 A * 2/1997 Kimura ....................... 345/89
5,940,142 A * 8/1999 Wakitani et al. ............ 348/671
5,982,344 A * 11/1999 Tokunaga .................... 345/67
6,034,656 A * 3/2000 Yamamoto et al. ........... 345/60
6,091,396 A * 7/2000 Minami et al. ............. 345/147
6,097,358 A * 8/2000 Hirakawa et al. ............. 345/63
6,100,939 A * 8/2000 Kougami et al. ........... 348/687
6,236,380 B1 * 5/2001 Wani et al. .................. 345/60
6,323,880 B1 * 11/2001 Yamada ...................... 345/690
6,518,977 B1 * 2/2003 Naka et al. ................ 345/690

FOREIGN PATENT DOCUMENTS

EP 0 444 962 A2 9/1991
EP 0774745 5/1997
EP 0838799 4/1998

OTHER PUBLICATIONS

Search Report for European Patent Appln. No. 98115607.8.

* cited by examiner

*Primary Examiner*—Michael H. Lee
*Assistant Examiner*—Jean W. Désir
(74) *Attorney, Agent, or Firm*—Joseph S. Tripoli; Harvey D. Fried; Sammy S. Henig

(57) ABSTRACT

Plasma Display Panels (PDP) are becoming more and more interesting for TV technology. Due to the larger size of PDPs, with larger viewing angle the large area flicker effect will become more serious in the future, in particular when handling 50 Hz video standards. This invention proposes a different sub-field organisation, with different coding, which reduces large area flicker artefact, and which includes grouping of sub-fields in two sub-field groups wherein the two sub-field groups are identical in terms of the most significant sub-fields and different in terms of the least significant sub-fields, and a sub-field coding process that distributes luminance weight symmetrically over the two sub-field groups so as to minimize the large area flicker luminance component.

16 Claims, 2 Drawing Sheets

METHOD AND APPARATUS FOR PROCESSING VIDEO PICTURES, IN PARTICULAR FOR LARGE AREA FLICKER EFFECT REDUCTION

BACKGROUND OF THE INVENTION

The invention relates to a method and apparatus for processing video pictures, in particular for large area flicker effect reduction.

More specifically the invention is closely related to a kind of video processing for improving the picture quality of pictures which are displayed on matrix displays like plasma display panels (PDP), display devices with digital micro mirror arrays (DMD) and all kind of displays based on the principle of duty cycle modulation (pulse width modulation) of light emission.

Although plasma display panels are known for many years, plasma displays are encountering a growing interest from TV manufacturers. Indeed, this technology now makes it possible to achieve flat colour panels of large size and with limited depths without any viewing angle constraints. The size of the displays may be much larger than the classical CRT picture tubes would have ever been allowed.

Referring to the latest generation of European TV sets, a lot of work has been made to improve its picture quality. Consequently, there is a strong demand, that a TV set built in a new technology like the plasma display technology has to provide a picture so good or better than the old standard TV technology.

A plasma display panel utilises a matrix array of discharge cells which could only be switched ON or OFF. Also unlike a CRT or LCD in which grey levels are expressed by analogue control of the light emission, in a PDP the grey level is controlled by modulating the number of light pulses per frame. This time-modulation will be integrated by the eye over a period corresponding to the eye time response. For static pictures, this time-modulation, repeats itself, with a base frequency equal to the frame frequency of the displayed video norm. As known from the CRT-technology, a light emission with base frequency of 50 Hz, introduces large area flicker, which can be eliminated by field repetition in 100 Hz CRT TV receivers.

Contrary to the CRTs, where the duty cycle of light emission is very short, the duty cycle of light emission in PDPs is ~50% for middle grey. This reduces the amplitude of the 50 Hz frequency component in the spectrum, and thus large area flicker artefact, but due to the larger size of PDPs, with a larger viewing angle, even a reduced large area flicker becomes objectionable in terms of picture quality. The present trend of increasing size and brightness of PDPs, will also contribute to aggravate this problem in the future.

SUMMARY OF THE INVENTION

It is an object of the present invention to disclose a method and an apparatus which reduces the large area flicker artefact in PDPs in particular for 50 Hz video norms, without incurring extra costs similar to those required by 100 Hz TV receivers.

The reduction of the large area effect is made by utilising an optimised sub-field organisation for the frame period. The sub-fields of a pixel are organised in two consecutive groups, and to a value of a pixel a code word is assigned which distributes the active sub-field periods equally over the two sub-field groups.

This solution has the effect that the 50 Hz frequency component is substantially reduced compared to a sub-field organisation where only one sub-field group is used. The repetition of 50 Hz heavy lighting periods is substituted by a repetition of 100 Hz small lighting periods. By using this method virtually no extra costs are added, except for a slight increase in the PDP control complexity.

Advantageously, additional embodiments of the inventive method are disclosed herein. The use of identical structures for the two sub-field groups (for the most significant sub-fields) helps to make sure that the two lighting periods have similar characteristics. The weight of the least significant sub-fields is small and does not introduce significant large area flicker. This is the reason why it is not required that the least significant sub-fields are identical for the two sub-field groups.

In order to be able to display also non-standard video signals with variations in the horizontal line synchronisation signal, like the ones generated by video recorders or video games, a vertical blanking period has also to be used where no sub-field is addressed. Here, it is advantageous when this vertical blanking period is replaced by two vertical blanking periods, inserted between every pair of consecutive sub-field groups. This is similar to what happens in 100 Hz CRT based TV receivers.

The concrete sub-field organisation is advantageous for 50 Hz video norms. Compared to an optimised sub-field organisation for the 60 Hz video norms, like NTSC, there are more sub-fields used which is easily possible, because the frame period is longer.

BRIEF DESCRIPTION OF THE DRAWING

Exemplary embodiments of the invention are illustrated in the drawings and are explained in more detail in the following description.

In the figures.

DESCRIPTION OF THE PREFFERED EMBODIMENTS

In the field of video processing is an 8-bit representation of a luminance level very common. In this case each level will be represented by a combination of the following 8 bits:

$$2^0=1,\ 2^1=2,\ 2^2=4,\ 2^3=8,\ 2^4=16,\ 2^5=32,\ 2^6=64,\ 2^7=128$$

Figure 1:
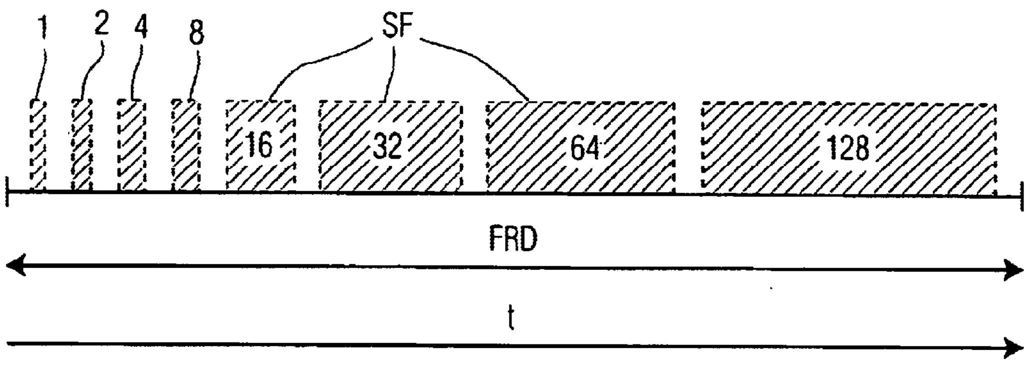
FIG. 1 shows an illustration for explaining the sub-field concept of a PDP.

To realise such a coding scheme with the PDP technology, the frame period will be divided in 8 lighting periods which are also very often referred to sub-fields, each one corresponding to one of the 8 bits. The duration of the light pulse for the bit $2^1=2$ is the double of that for the bit $2^0=1$. With a combination of these 8 sub-periods, we are able to build said 256 different grey levels. E.g. the grey level 92 will thus have the corresponding digital code word % 1011100. It should be appreciated, that the sub-fields may consist of a number of small pulses with equal amplitude and equal duration. Without motion, the eye of the observer will integrate over about a frame period all the sub-periods and will have the impression of the right grey level. The above-mentioned sub-field organisation is shown in FIG. 1.

Most of the developments for PDPs have been made for 60 Hz video standards, like NTSC. For these video standards it has been found that a refined sub-field organisation should better be used to avoid artefacts and improve picture quality.

Figure 2:
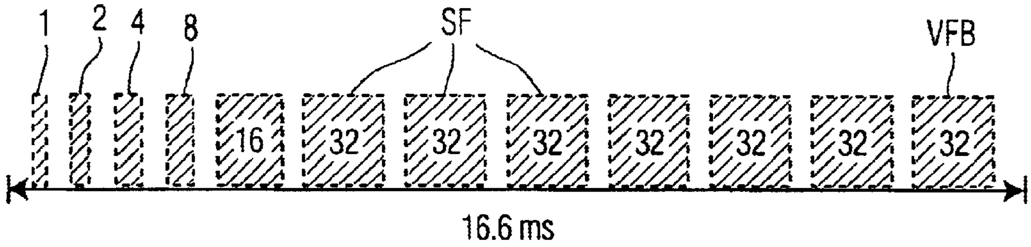
FIG. 2 shows a typical sub-field organisation used for 60 Hz video standards.

An example of a commonly used sub-field organisation for 60 Hz video standards is shown in FIG. 2. The sub-field number has been increased to 12 sub-fields SF. The relative duration of the sub-fields are given in FIG. 2. When all sub-fields are activated, the lighting phase has a relative duration of 255 relative time units. The value of 255 has been selected in order to be able to continue using the above mentioned 8 bit representation of the luminance level or RGB data which is being used for PDPs. The seven most significant sub-fields have a relative duration of 32 relative time units. In the field of PDP technology, the relative duration of a sub-field is often referred to the 'weight' of a sub-field, the expression will also be used hereinafter. Between each sub-field SF, there is a small time period in which no light is emitted. This time period is used for the addressing of the corresponding plasma cells. After the last sub-field a longer time period where no light is emitted is added. This time period corresponds to the vertical blanking period of the video standard. The implementation of such a vertical blanking period is necessary in order to be able to handle non-standard video signals generated in VCR's or video games, etc.

A digital representation of the grey level 92 in this sub-field organisation is e.g. 000001111100. This figure is a 12 bit binary number corresponding to the 12 sub-fields. It will be used to control the lighting pulses for the corresponding pixel during a frame period. It should be noted, that there exist a few other possible 12 bit code words for the same grey level, due to the fact that there are seven sub-fields width identical weight.

Figure 3:
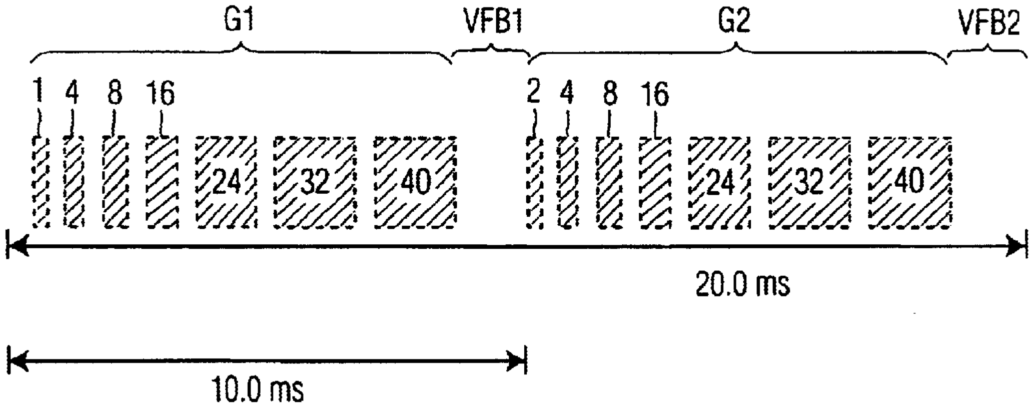
FIG. 3 shows a new sub-field organisation for 50 Hz video standards.

In FIG. 3 a new sub-field organisation according to the invention is shown for 50 Hz video standards. The frame period for 60 Hz video standards is 16.6 ms and for 50 Hz 20 ms and thus larger for 50 Hz video standards. This allows for the addressing of more sub-fields in 50 Hz video standards. In the example shown in FIG. 3 the number of sub-fields has been increased to 14. This does not cause extra costs since the added time to the frame period is greater than the added number of sub-fields: (20.0/16.6)>(14/12).

The sub-fields are structured in two separate sub-field groups G1, G2.

One vertical frame blanking period has been replaced by two vertical frame blanking periods VFB1, VFB2, one at the end of the frame period and the other between the two sub-field groups.

The 2 sub-field groups are identical in terms of the six most significant sub-fields and different in terms of the least significant sub-field. The weight of the least significant sub-field is small and does not introduce significant large area flicker, and this is the reason why it is not necessary that they are also identical.

For large area flicker effect reduction a sub-field coding process that distributes luminance weight of a given pixel value symmetrically over the 2 sub-field groups is also applied. A small difference in luminance weight between the 2 sub-field groups, means a small 50 Hz luminance frequency component, and thus small levels of large area flicker. For the sub-field coding process there is no need of a complicated calculation. A corresponding table where the code words for the 256 different grey levels/pixel values are stored can be used.

The coding process can best be explained with an example. Consider the grey level/pixel value 87. This number can be written in the following form:

$$87=3+44+40$$

87 has been split in three components. The first component, 3=(87 mod 4) is the component which is to be coded by the least significant sub-fields of the two sub-field groups. The second and third component, which must be multiples of 4 (because of the fact that the six most significant sub-fields in both groups have weights which are multiples of four) are made as equal as possible. If they cannot be made equal, as this is the case with 87, the second component, to be coded with the sub-fields of group 1, should be made greater by 4. In the example, 44 is to be coded with the sub-fields of group G1, and 40 is to be coded with the sub-fields of group 2. Using these rules, the final code is:

$$\underline{87} = \begin{matrix} \underline{1}*1+\underline{1}*4+\underline{0}*8+\underline{1}*16+\underline{1}*24+\underline{0}*32+\underline{0}*40 \\ \underline{1}*2+\underline{0}*4+\underline{0}*8+\underline{1}*16+\underline{1}*24+\underline{0}*32+\underline{0}*40 \end{matrix} \text{ or}$$

$$87=45+42$$

$$45=1+4+16+24 \text{ (Group 1)}$$

$$42=2+16+24 \text{ (Group 2) or}$$

$$87=00110010011011.$$

With this coding process, the difference in weight between the two sub-field groups is never greater than 5.

A second example will be explained with grey level/pixel value 92.

$$92=0+48+44 \Rightarrow$$

$$\underline{92} = \begin{matrix} \underline{0}*1+\underline{0}*4+\underline{1}*8+\underline{1}*16+\underline{1}*24+\underline{0}*32+\underline{0}*40 \\ \underline{0}*2+\underline{1}*4+\underline{0}*8+\underline{1}*16+\underline{1}*24+\underline{0}*32+\underline{0}*40 \end{matrix} \text{ or}$$

$$92=48+44$$

$$48=8+16+24 \text{ (Group 1)}$$

$$44=4+16+24 \text{ (Group 2) or}$$

$$92=00110100011100.$$

Figure 4:
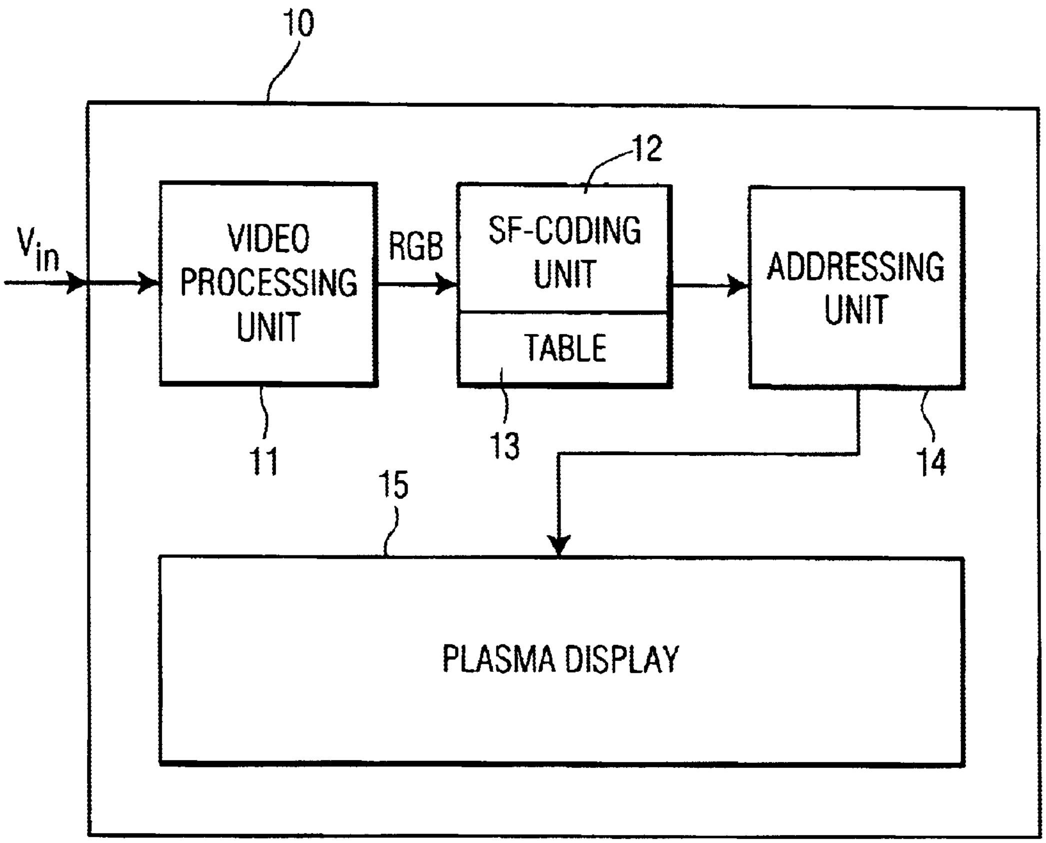
FIG. 4 shows a block diagram of the apparatus according to the invention.

An apparatus according to the invention is shown in FIG. 4. The apparatus may be integrated together with the PDP matrix display. It could also be in a separate box which is to be connected with the plasma display panel. Reference no. 10 denotes the whole apparatus. The video signal is fed to the apparatus via the input line $V_{in}$. Reference no. 11 denotes a video processing unit, wherein the video signal is digitalized and Y,U, V data is produced. As plasma displays are addressed in progressive scan mode, interlace video standards require a previous conversion, here. For interlace—progressive scan conversion many solutions are known in the art which can be used here. Also, an YUV/RGB data conversion will be made in this unit as the PDPs work with RGB data. The generated RGB data is forwarded to the sub-field coding unit 12. Therein, to each RGB pixel value the corresponding code word will be selected from a table 13. These code words are forwarded to the frame memory in addressing unit 14 of the PDP 10. With these data the addressing unit 14 controls the plasma display 15.

For 60 Hz video norms the large area flicker effect is not so disturbing as for 50 Hz video standards. While the invention has been explained for 50 Hz video norms it is apparent, that it can also be used to improve the picture quality of 60 Hz video norms.

The blocks shown in FIG. 4 can be implemented with appropriate computer programs rather than with hardware components.

The invention is not restricted to the disclosed embodiments. Various modifications are possible and are considered to fall within the scope of the claims. E.g. the number and weights of the used sub-fields can vary from implementation to implementation.

All kinds of displays which are controlled by using different a PWM like control for grey-level variation can be used in connection with this invention.

What is claimed is:

1. A method for processing video pictures, useful for large area flicker effect reduction, the video pictures comprising pixels having assigned one or more pixel values representing luminance of the pixels, the pixel values being digitally coded into digital code words, the digital code word determining the length of the time period during which the corresponding pixel of a display is activated, wherein to each bit of the digital code word a certain activation duration is assigned, defining a sub-field, the sum of the duration of the sub-fields according to a given code word determining the length of the time period during which the corresponding pixel is activated, said method comprising the steps of:

organizing the sub-fields for a video frame period being characterized by the reciprocal value of the frame repetition rate in two consecutive groups, and positioning the two sub field groups in the frame period according to a time raster that corresponds to the doubling of the frame repetition rate, wherein in a sub-field coding process to a pixel value a code word is assigned which distributes the active sub-field periods equally over the two sub-field groups, in the sub-field coding process three components of a given pixel value are individually coded, the first component is coded with a number of lower significant sub-fields of both sub-field groups, the second component is coded with the higher significant sub-fields of the first group and the third component is coded with the higher significant sub-fields of the second group.

2. The method according to claim 1, wherein the number of sub-fields in the two sub-field groups is identical.

3. The method according to claim 2, wherein each of the sub-fields of the two sub-field groups is identical in weight except for a number of least significant sub-fields.

4. The method according to claim 1, wherein a vertical blanking period of the video frame is subdivided in two parts, the first part located between the last sub-field of the first sub-field group and the first sub-field of the second sub-field group, and the second part located between the last sub-field of the second sub-field group and the first sub-field of the next video frame period.

5. The method according to claim 1, wherein the video frame period is sub-divided into 14 sub-fields, the maximum activation period of a pixel during the frame period having a relative duration of 256 time units, and wherein each of the sub-fields of the first of said two sub-field groups has a different duration, and wherein each of the sub-fields of the second of said two sub-field groups has a different duration, and wherein at least one sub-field of the first sub-field group has a same duration as at least one sub-field of the second sub-field group.

6. The method according to claim 1, wherein a frame period lasts 20 milliseconds (ms), and wherein the first sub-field of the second group starts 10 ms after the beginning of the frame period.

7. The method according to claim 1, wherein for the generation of the code word which is assigned to the pixel value, the pixel value is split into three components, the first component being the pixel value modulus a given number, and the second and third components which are multiples of the given number, being made as equal as possible to one another, and wherein the first component is coded with the least significant sub-fields of both groups and the second component is coded with the most significant sub-fields of the first group and the third component is coded with the most significant sub-fields of the second group.

8. The method according to claim 7, wherein the value of the second component is greater by the given number than the value of the third component.

9. A method for processing video pictures, useful for large area flicker effect reduction the video pictures comprising pixels digitally coded into digital code words, the digital code word determining the length of the time period during which the corresponding pixel of a display is activated, wherein to each bit of the digital code word a certain activation duration is assigned, defining a sub-field, the sum of the duration of the sub-fields according to a given code word determining the length of the time period during which the corresponding pixel is activated, said method comprising the steps of:

organizing the sub-fields for a frame period in two consecutive groups, the sub-fields of the two groups being identical in weight except for a number of least significant sub-fields defining individual sub-fields, the sub-field coding process including the steps of splitting a pixel value into three components, the first component being the pixel value modulus a given number, and the second and third components which are multiples of the given number, are made as equal as possible, the method comprising the further steps of coding the first component with the individual sub-fields of both groups, coding the second component with the higher significant sub-fields of the first group, and coding the third component with the higher significant sub-fields of the second group.

10. Apparatus for processing video pictures, useful for large area flicker effect reduction, the video pictures comprising pixels having assigned one or more pixel value representing luminance of the pixel, the pixel values being digitally coded into digital code words, the digital code word determining the length of the time period during which the corresponding pixel of a display is activated, wherein to each bit of the digital code word a certain activation duration is assigned, defining a sub-field, the sum of the duration of the sub-fields according to a given code word determining the length of the time period during which the corresponding pixel is activated, the apparatus comprising, sub-field organization means for positioning the two sub-field groups in the frame period being characterized by the reciprocal value of the frame repetition rate, according to a time raster that corresponds to the doubling of the fame repetition rate, sub-field coding means for assigning to a pixel value a code word which distributes the active sub-field periods equally over the two sub-field groups, and wherein the sub-field coding is based on an individual coding of three components of a given pixel value, the first component coded with a number of lower significant sub-fields of both sub-field groups, the second component coded with the higher significant sub-fields of the first sub-field group and the third component coded with the higher significant sub-fields of the second sub-field group.

11. The apparatus according to claim 10, wherein the sub-field coding means comprise a code table in which for all possible pixel values the corresponding code word is stored.

12. The apparatus according to claim 10, further comprising a matrix display.

13. The apparatus according to claim 12, wherein the matrix display is a plasma display.

14. The apparatus according to claim 12, wherein the matrix display is a DMD display.

15. The apparatus according to claim 10, further comprising calculation means for splitting the pixel value of a given pixel into three components, the first component being the pixel value modulus a given number, and the second and third components which are multiples of the given number, being made as equal as possible to one another, and wherein the sub-field coding means codes the first component with the least significant sub-fields of both groups, the second component with the most significant sub-fields of the first group and the third component with the most significant sub-fields of the second group.

16. The apparatus according to claim 15, wherein the value of the second component is made greater by the given number than the value of the third component.

* * * * *